(12) United States Patent
Stevens et al.

(10) Patent No.: US 7,529,483 B2
(45) Date of Patent: May 5, 2009

(54) COMMUNICATION SYSTEMS

(75) Inventors: Roderick Leonard Wallace Stevens, Eastleigh (GB); Michael John McTiffin, Winchester (GB); Paul Roderick Webb, Southampton (GB)

(73) Assignee: Roke Manor Research Limited, Romsey (GB)

( * ) Notice: Subject to any disclaimer, the term of this patent is extended or adjusted under 35 U.S.C. 154(b) by 489 days.

(21) Appl. No.: 10/471,941

(22) PCT Filed: Mar. 18, 2002

(86) PCT No.: PCT/GB02/01295

§ 371 (c)(1),
(2), (4) Date: Feb. 24, 2004

(87) PCT Pub. No.: WO02/076138

PCT Pub. Date: Sep. 26, 2002

(65) Prior Publication Data

US 2004/0131087 A1    Jul. 8, 2004

(30) Foreign Application Priority Data

Mar. 20, 2001 (GB) ................................. 0106902.0
Jan. 18, 2002 (GB) ................................. 0201107.0

(51) Int. Cl.
*H04J 14/00* (2006.01)
(52) U.S. Cl. ............................. 398/54; 398/47; 398/52; 398/53; 398/75; 398/98; 398/102
(58) Field of Classification Search ................... 398/50, 398/53, 102
See application file for complete search history.

(56) References Cited

U.S. PATENT DOCUMENTS

| 5,303,078 A | 4/1994 | Cisneros et al. |
| 5,367,520 A | 11/1994 | Cordell |
| 5,463,624 A * | 10/1995 | Hogg et al. ................. 370/461 |

(Continued)

FOREIGN PATENT DOCUMENTS

GB        2 353 157 A    2/2001

(Continued)

OTHER PUBLICATIONS

Chen, Yuhua "WDM burst switching for petabit capacity routers", Military Communications Conference Proceedings, 1999. MILCOM 1999. IEEE Oct. 31-Nov. 3, 1999 vol. 2, On pp. 968-973 vol. 2.*

(Continued)

*Primary Examiner*—Kenneth N Vanderpuye
*Assistant Examiner*—Danny W. Leung
(74) *Attorney, Agent, or Firm*—Crowell & Moring LLP

(57) ABSTRACT

A communication system for the mutual interconnection of a plurality of lower traffic level (5 Terabit) switch nodes via a relatively higher traffic level (Petabit) connection bus, which system comprises in operative association with each node, a two part TDM optical data management interface, wherein a first of the two parts comprises a time slot resequencer which serves to provide for the transmission of data from its associated node to the bus, and wherein a second of the two parts comprises a time slot specific combiner which serves for the transmission of data from the bus to its associated node, each node and the bus having independent data scheduling.

8 Claims, 1 Drawing Sheet

U.S. PATENT DOCUMENTS

| | | | | |
|---|---|---|---|---|
| 5,486,943 | A | * | 1/1996 | Sasayama et al. ............. 398/75 |
| 5,604,734 | A | | 2/1997 | Buhrgard |
| 6,466,572 | B1 | * | 10/2002 | Ethridge et al. ............. 370/352 |
| 6,665,495 | B1 | * | 12/2003 | Miles et al. ................... 398/54 |
| 6,891,856 | B2 | * | 5/2005 | Umayabashi ............... 370/468 |

FOREIGN PATENT DOCUMENTS

| | | |
|---|---|---|
| GB | 2 362 280 A | 11/2001 |
| JP | 6-120973 | 4/1994 |
| JP | 8-47013 | 2/1996 |
| WO | WO 98/34379 | 8/1998 |

OTHER PUBLICATIONS

H. Scott Hinton: "Photonic Switching Fabrics", Apr. 1990—IEEE Communications Magazine, pp. 71-89.

Wen Liangsheng et al: "A New Packet Switch for Optical Time Slotted Packet Switching Networks Based on OTDM", Proceedings of ICCT2003.

Richard A. Thompson et al: "Elementary Photonic Switching Modules in Three Divisions", IEEE Journal on Selected Areas in Communications, vol. 14, No. 2, Feb. 1996.

Szymanski T. H.: "Architecture of a Terabit Free-Space Intelligent Optical Backplane"—Journal of Pa5rallel and Distributed Computing, Academic Press, Duluth, MN, US vol. 55, No. 1—Nov. 25, 1998, pp. 1-31, XP00078629.

Matsumoto T. et al: "Studies on Optical Digital Cross-Connect Systems for Very-High-Speed Optical Communications Networks"—IEICE Transactions on Communications Institute of Electronics Information and Comm. Eng. Tokyo, Japan, vol. E83-B, No. 1, Jan. 2000, pp. 30-37, XP000940278.

Szymanski T.: "A Photonic Backplane Architecture for Broadband Switching" Proceedings of the SPIE, SPIE Bellingham, VA, US, vol. 2692, Jan. 1996, pp. 86-99, XP000853506.

Angliss B. E. et al: "A dynamically configurable token-based optical backplane", Broadband Optical Networks and Technologies: An Energing Reality/Optical MEMS/Smart Pixels/Organic Optics and Optoelectronics. 1998, IEEE/LEOS Summer Topical Meetings, Monterey, CA, USA Jul. 20-24, 1998, New York, NY, USA, IEEE, US, Jul. 20, 1998, pp. IV-35-IV-36, XP010292452.

Magnus Buhrgard: "A Flexible Terabit/s ATM Switch with Photonic Switching" ISS '95, World Telecommunications Congress. (International Switching Symposium). Advanced Switching Technologies for Universal Telecommunications at the Beginning of the 21[st.] Century. Berlin, Apr. 23-28, 1995, Proceedings of the International Swit, vol. 2, SYMP. 15, Apr. 23, 1995, pp. 442-446, XP0000495697, ISBN: 3-8007-2093-0.

Nishihara, Murakami, Yamada, Miyahara, "Unified transport network for future Peta bit network," Proceedings of the IEEE Conferene on High Performance Switching and Routing, 2000. ATM 2000, pp. 25-32.

* cited by examiner

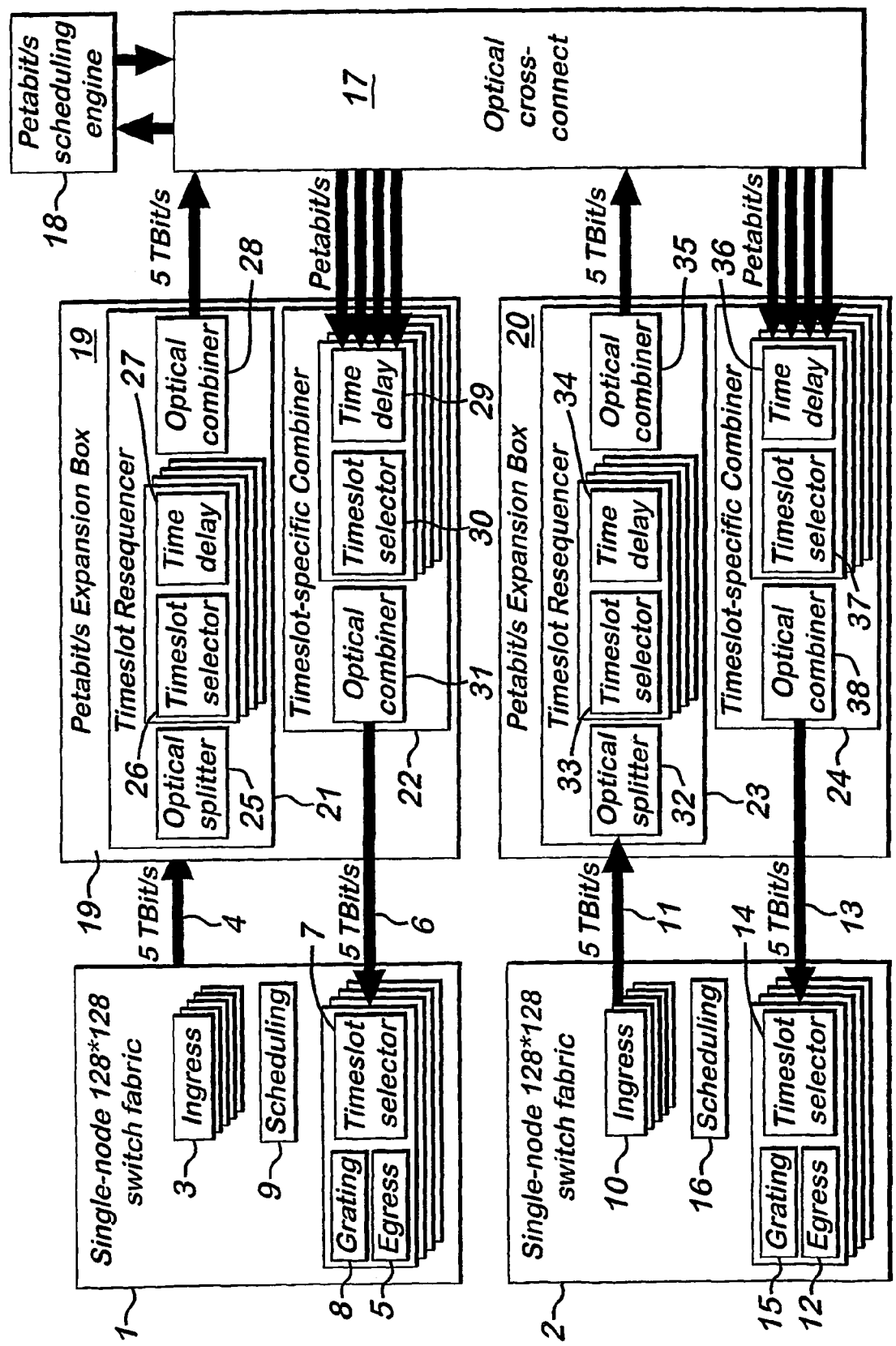

COMMUNICATION SYSTEMS

The present invention relates to communication systems. More particularly but not exclusively it relates to such systems which use optical TDM (time division multiplex) switch cores.

BACKGROUND OF THE INVENTION

Switch cores of this general type are well known to those skilled in the art, and moreover, the operation of an optical backplane and/or apparatus for use therewith is described in co-pending Patent Application Nos. GB 2353157A, and GB 2362280A, to which attention is hereby directed. Accordingly, neither detailed switch core description nor detailed optical backplane description herein, is believed to be necessary.

The capacity of the apparatus described in GB2362280A is limited by the throughput of the optical backplane. Typically this is 5 Terabit/s. However in the future, higher capacity switch cores will be required and these can be achieved by the interconnection of a plurality of 5 Terabit/s switch nodes so that any one or more of the ingress ports of any one of such nodes can be selectively connected to the egress port or ports of any other of such nodes via a static Petabit/s optical connection bus. One object of the present invention, therefore is to provide an optical interconnection system to satisfy this particular requirement. It should however be understood, that the present invention may also find more general application in communication systems.

SUMMARY OF THE INVENTION

According to the present invention, a communication system for the mutual interconnection of a plurality of switch nodes via a connection bus comprises in operative association with each node a two part TDM data management interface, wherein a first of the two parts comprises a time slot resequencer which serves to provide for the transmission of data from its associated node to the bus, and wherein a second of the two parts comprises a time slot specific combiner which serves for the transmission of data from the bus to its associated node, each node and the bus having independent data scheduling, the switch nodes being operational at a lower traffic transmission level than the connection bus.

The communication system may be a TDM optical system wherein data is transmitted optically between the switch nodes, the interface, and the bus.

The timeslot resequencer of each interface may comprise an optical splitter fed from its associated switch node and coupled to the bus via a timeslot selector, a time delay device, and an optical combiner which feeds the bus.

The timeslot-specific combiner of each interface may comprise a time delay device, a timeslot selector and an optical combiner via which its associated switch node is fed from the bus.

The switch nodes of the system may each comprise ingress ports coupled to the timeslot resequencer of an associated interface, and egress ports coupled via grating means and a time slot selector to the timeslot-specific combiner of this associated interface.

The interface may be arranged to provide for 5 Terabit/s coupling between the switch nodes and the bus and for Petabit/s coupling between the bus and the switch nodes.

The switch nodes may each comprise a 128×128 switch fabric.

Other objects, advantages and novel features of the present invention will become apparent from the following detailed description of the invention when considered in conjunction with the accompanying drawings.

BRIEF DESCRIPTION OF THE DRAWINGS

The single FIGURE is a schematic block/flow diagram of a switch node interconnection system.

DETAILED DESCRIPTION OF THE INVENTION

Referring now to the drawing, a communication system comprises a plurality of 5 Terabit switch nodes, only two of which 1, and 2, are shown in the drawing for simplicity of description. Each of the nodes 1, 2, comprises a 128×128 single node switch fabric. The node 1, includes ingress ports 3, coupled to an output line 4, and egress ports 5, each coupled to an input line 6, via a timeslot selector 7, and an optical grating 8, switch operation being locally controlled by means of a scheduler 9. The other node 2, is substantially identical comprising, ingress ports 10, coupled to an output line 11, and egress ports 12, each coupled to an input line 13, via a time slot selector 14, and an optical grating 15, switch operation being locally controlled by a scheduler 16.

In order to connect any one or more of the ingress ports 3, of the node 1, via an optical bus arrangement which may be implemented as a crossconnect 17, which has its own scheduling engine 18, to any egress port of any other node, (such as one of the egress port or ports 12, of the node 2, for example), a two level traffic management interface system is provided which comprises for each node a similar Petabit expansion box. In this particular embodiment boxes 19, and 20, for the nodes 1, and 2, respectively are provided.

The expansion box 19, handles traffic to/from the node 1, and comprises a time slot resequencer 21, which operates on the 5 Terabit level to couple the ingress ports 3, to the crossconnect 17, and a time-slot specific combiner 22, which operates on the Petabit level to couple the crossconnect 17, to the egress ports 5.

Similarly, the expansion box 20, handles traffic to/from the node 2, and comprises a time slot resequencer 23, which operates on the 5 Terabit level to couple the ingress ports 10, to the crossconnect 17, and a time-slot specific combiner 24, which operates to on the Petabit level to couple the crossconnect 17, to the egress ports 12.

The time slot resequencer 21, operating on the 5 Terabit level, comprises an optical splitter 25, fed from the line 4, a time slot selector 26, a time delay 27, and an optical combiner 28, coupled to the crossconnect 17, whereas its associated timeslot-specific combiner 22, which operates on the Petabit level, comprises time delay 29, fed from the crossconnect 17, timeslot selector 30, and an optical combiner 31, which is coupled to the line 6, so as in effect to reverse the data expansion process.

Similarly, the time slot resequencer 23, which operates on the 5 Terabit level, comprises an optical splitter 32, fed from the line 11, a time slot selector 33, a time delay 34, and an optical combiner 35, coupled to the crossconnect 17, whereas its associated timeslot-specific combiner 24, which operates on the Petabit level, comprises time delay 36, fed from the crossconnect 17, a timeslot selector 37, and an optical combiner 38, which is coupled to the line 13.

It will be appreciated that although only two nodes are shown in this example, several nodes may be similarly interconnected to the crossconnect 17, each via its own Petabit expansion box.

In operation, the system as just before described utilises algorithms which run at two levels, i.e. the 5 Terabit level of the switch nodes and the Petabit level of the extension system comprising the expansion boxes 19, and 20, and the cross-connect 17, each node being responsible for managing the slot allocation or scheduling of its own backplane. It will pass to the extension system, information concerning traffic destined for other nodes with which it is linked via the extension system. Once the extension system has opened a connection between two nodes, the local node will select which of its ingress ports will transmit to the egress port of the external node and pass that information to the traffic management system of the external node.

In order to carry information on the ingress nodes backplane, it must be extracted from that backplane, moved in time and inserted into a new slot on an extension backplane. This will carry the traffic to the external node where it will again be extracted, moved in time and inserted into the appropriate slot of the egress nodes back plane. This is in effect an optical time and space switch which is defined in this system by the splitters, couplers and delay lines/devices as shown.

A system as just before described has the advantage that use of the timeslot resequencers facilitate independent delay for each of the 128 timeslots and moreover, all 128 could be outputted if so required. In operation, the timeslot-specific combiners provide a 128:1 optical switch with 50 Pic/sec switching speed. It will be appreciated that scheduling resolves internal/external time slot contention and that the implementation is inherently scalable in accordance with traffic requirements.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A TDM optical communication system for the mutual interconnection of a plurality of switch nodes via an optical connection bus, wherein:
   each switch node is coupled in communication with the connection bus via a two part TDM data management interface;
   a first of the two parts comprises a time slot resequencer which serves to provide for the transmission of data from its associated node to the bus;
   a second of the two parts comprises a time slot specific combiner which serves for the transmission of data from the bus to its associated node;
   each node and the bus have independent data scheduling;
   the switch nodes are operational at a lower traffic transmission level than the connection bus; and
   all transmission of data between and within the switch nodes, the interface and the bus, is performed optically.

2. A communication system as claimed in claim 1, wherein the timeslot resequencer of each interface comprises:
   an optical splitter fed from its associated switch node and coupled to the bus via a timeslot selector;
   a time delay device; and
   an optical combiner which feeds the bus.

3. A communication system as claimed in claim 1, wherein the timeslot-specific combiner of each interface comprises:
   a time delay device;
   a timeslot selector; and
   an optical combiner via which its associated switch node is fed from the bus.

4. A communication system as claimed in claim 3, wherein the switch nodes of the system each comprise:
   ingress ports coupled to the timeslot resequencer of an associated interface; and
   egress ports coupled via grating means and a time slot selector to the time slot-specific combiner of this associated interface.

5. A communication system as claimed in claim 1, wherein the interface is arranged to provide for five Terabit coupling between the switch nodes and the bus, and for Petabit coupling between the bus and the switch nodes.

6. A communication system as claimed in claim 1, wherein the switch nodes each comprise a 128×128 switch fabric.

7. A communication system as claimed in claim 2, wherein the timeslot-specific combiner of each interface comprises:
   a time delay device;
   a timeslot selector; and
   an optical combiner via which its associated switch node is fed from the bus.

8. A communication system as claimed in claim 7, wherein the switch nodes of the system each comprise:
   ingress ports coupled to the timeslot resequencer of an associated interface; and
   egress ports coupled via grating means and a time slot selector to the time slot-specific combiner of this associated interface.

* * * * *